(No Model.) 3 Sheets—Sheet 1
F. GAUNT.
POTATO PLANTER.
No. 525,893. Patented Sept. 11, 1894.
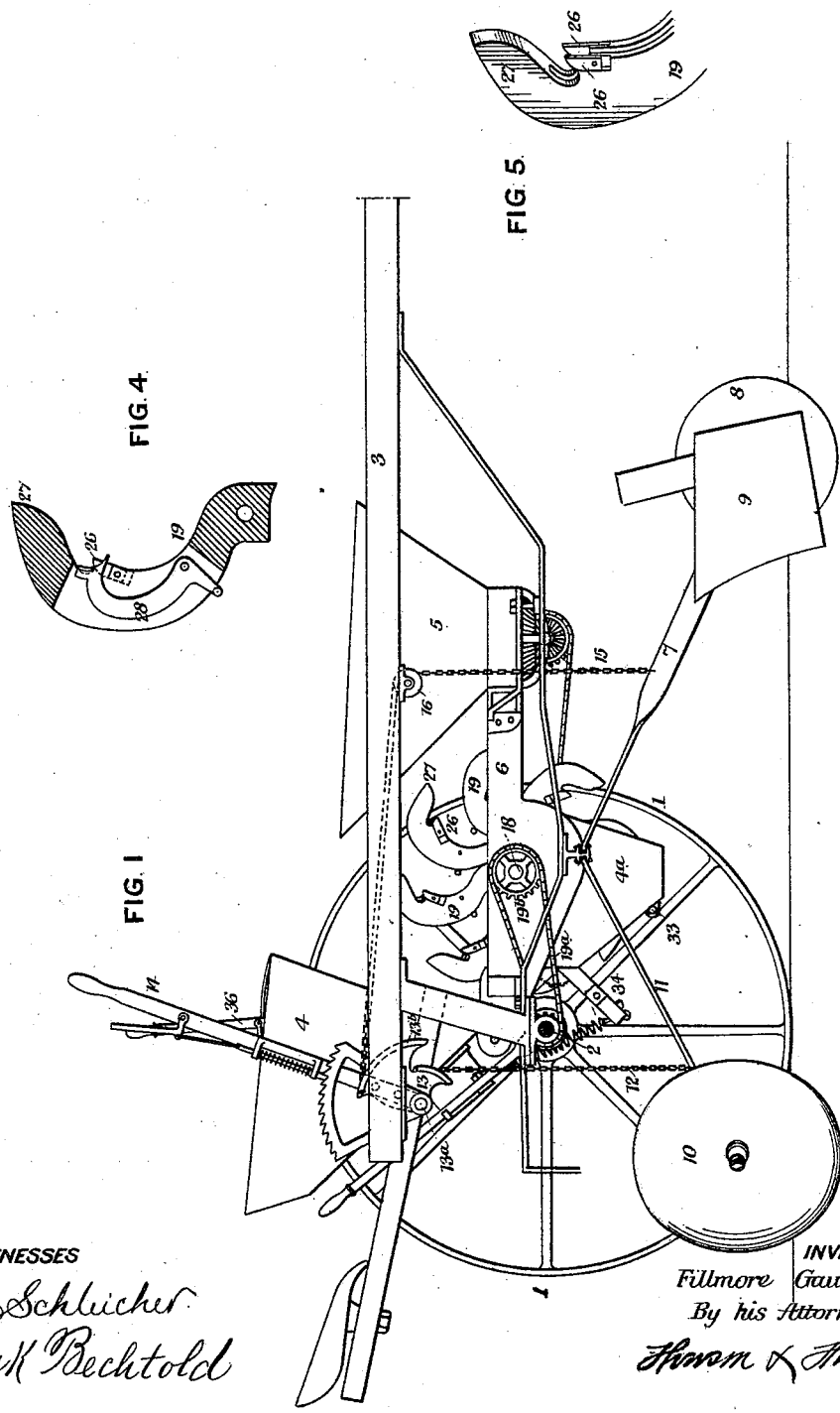
WITNESSES
R. Schlucher
Frank Bechtold
INVENTOR
Fillmore Gaunt
By his Attorneys
Hmm & Hmm

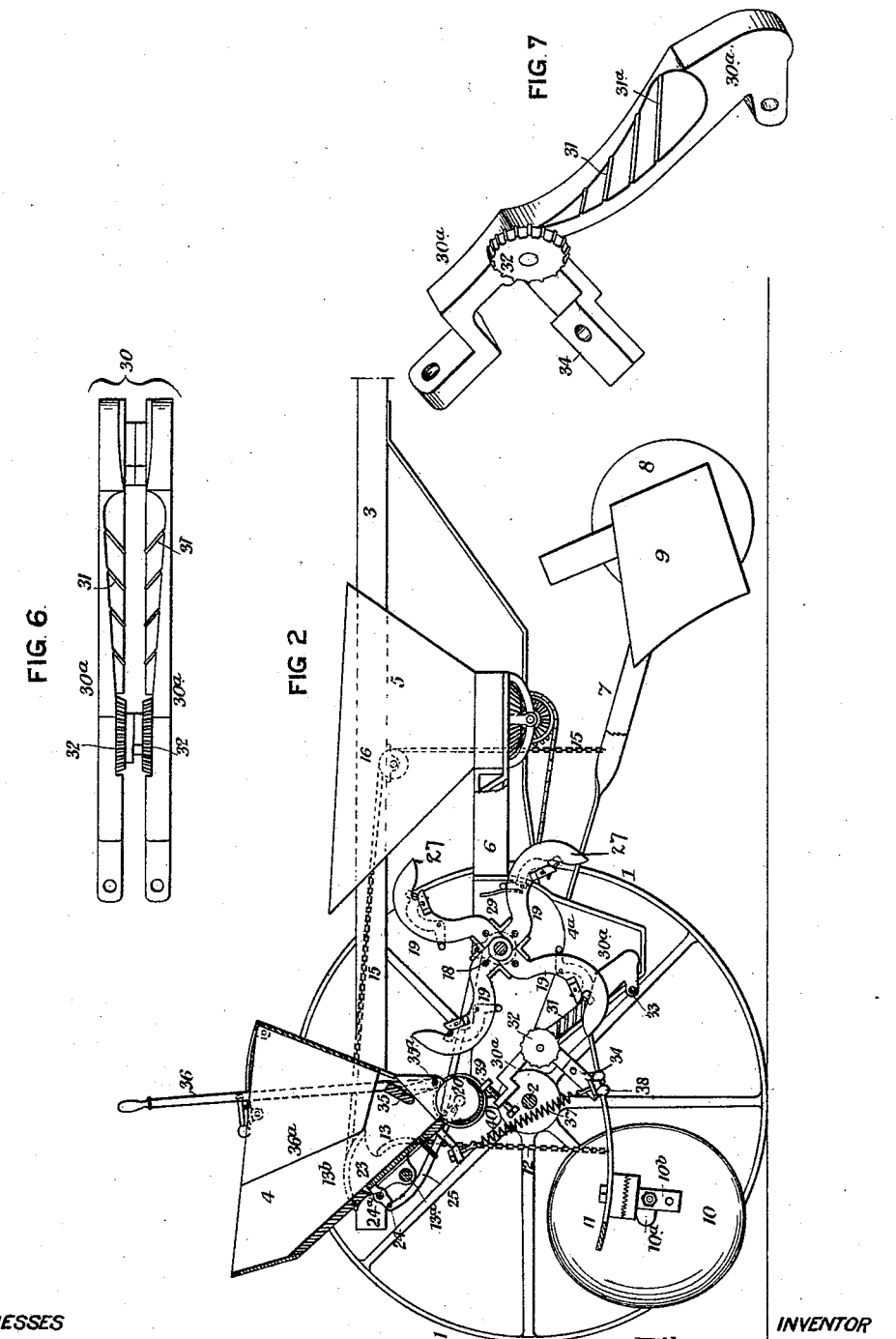

(No Model.) 3 Sheets—Sheet 3.
F. GAUNT.
POTATO PLANTER.
No. 525,893. Patented Sept. 11, 1894.
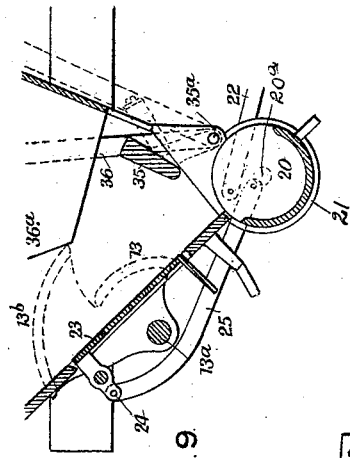
FIG. 9.
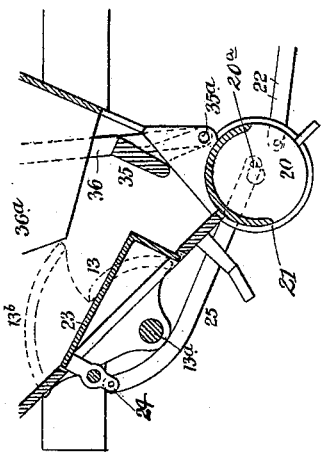
FIG. 10.
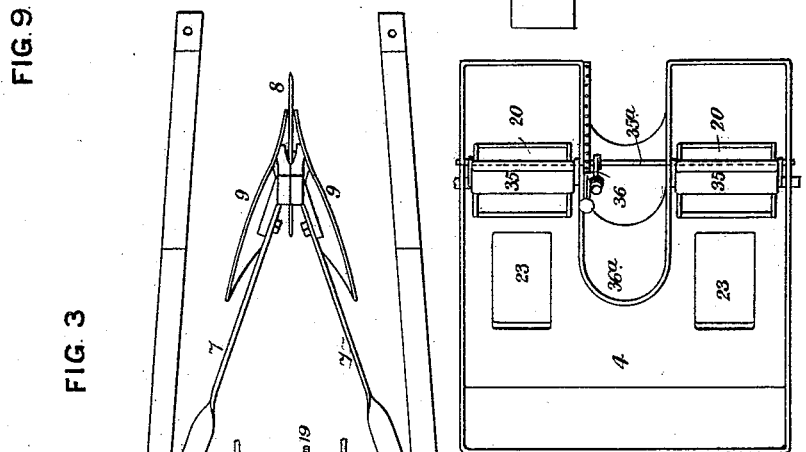
FIG. 8.
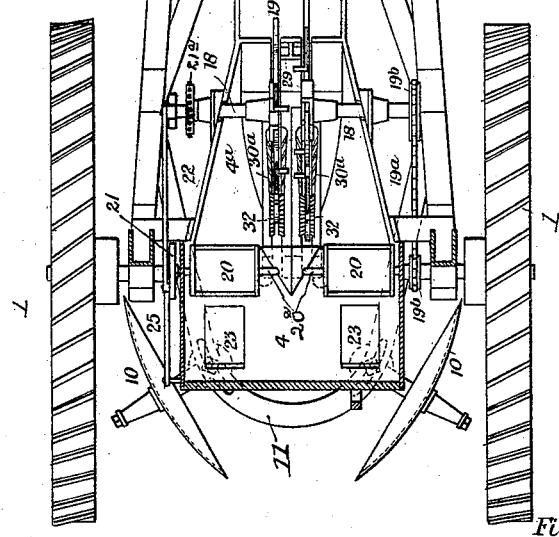
FIG. 3.
WITNESSES
R. Schleicher
Frank Bechtold
INVENTOR
Fillmore Gaunt
By his Attorneys

UNITED STATES PATENT OFFICE.

FILLMORE GAUNT, OF WOODSTOWN, NEW JERSEY, ASSIGNOR OF ONE-HALF TO EDWARD C. HAINES, OF SAME PLACE.

POTATO-PLANTER.

SPECIFICATION forming part of Letters Patent No. 525,893, dated September 11, 1894.

Application filed February 19, 1894. Serial No. 500,740. (No model.)

*To all whom it may concern:*

Be it known that I, FILLMORE GAUNT, a citizen of the United States, and a resident of Woodstown, Salem county, New Jersey, have invented certain Improvements in Potato-Planters, of which the following is a specification.

My invention relates to a potato planter of the same general type as that shown in Aspinwall's patent No. 235,401, dated December 14, 1880, the object of my invention being to render such a machine more certain and efficient in its operation than the machines now in use.

With this object in view, my invention comprises certain features of construction and combinations of parts fully set forth and specifically claimed hereinafter.

In the accompanying drawings:—Figure 1, is a side view of a potato planter constructed in accordance with my invention, one of the supporting wheels having been removed. Fig. 2, is a longitudinal section of the machine, partly in elevation. Fig. 3, is a plan view partly in section. Figs. 4, 5, 6, 7 and 8, are detailed views on a larger scale of parts of the machine; and Figs. 9 and 10, are sectional elevations illustrating the operation of the feeding devices.

The machine is mounted upon wheels 1 which are carried by an axle 2, and upon the latter is supported the fixed framework of the machine, said framework comprising the shafts 3, lower frame 6, a hopper 4 for the cut potatoes, or as they will be hereinafter termed, "seed," a seed receptacle $4^a$, and a hopper 5 at the front of the machine for the reception of fertilizing material.

The furrowing devices are carried at the front ends of pivoted arms 7 and consist of a central disk 8 and mold boards 9 on each side of the same, the central disk being free to rotate and serving as a cutter in order to facilitate the turning of the furrow by the mold boards when the ground is hard or is obstructed by roots or vines which would otherwise tend to clog the mold boards and interfere with the turning of the furrow by the same, the central cutting disk severing such roots or vines so that they can be readily thrown to one side or the other by the mold boards.

At the rear of the machine are covering disks 10 which are carried by a pivoted frame 11 and are not only inclined toward each other but are of concavo-convex form in order to gather the earth at each side of the furrow and heap it up over the potato seed and fertilizer dropped into the furrow by the action of the machine. The frame 11 is curved at the rear and is slotted for the reception of the bolts which secure the hangers of the disks 10 so that the latter can be adjusted from and toward each other as desired, and the spindles $10^a$ of the disks are carried by posts $10^b$ which can be turned so as to vary the angle of the disks in respect to each other. The frame 11 is connected by chains 12 to segments 13 mounted upon a rock shaft $13^a$ beneath the hopper 4 and the arms 7 are likewise connected to segments $13^b$ of larger radius on said shaft, by means of chains 15 which pass over pulleys 16 so that by retracting a lever 14 on the shaft $13^a$ both the frame 11 and the arms 7 can be raised and the furrowing and covering devices can be lifted out of action.

The potato seed are fed from the hopper 4 into the seed receptacle $4^a$, in the upper portion of which is located a shaft 18, which carries the impaling arms 19, said shaft being rotated by means of chain belt $19^a$, and sprocket wheels $19^b$ from the axle 2, hence by varying the size of either of the sprocket wheels $19^b$ the speed of the shaft 18, and the distance apart of the dropped seed can be governed, as desired.

The hopper 4 may have one or more delivery chutes for feeding the seed into the receptacle $4^a$, two of these chutes being shown in the present instance, and in order to regulate the delivery of the seed into the receptacle, each of the hopper chutes is provided with an intermittent feeding device consisting of a cup-shaped valve 20 journaled at the bottom of the chute, the shaft $20^a$ which carries the valves having a disk 21, which is connected by a rod 22 to a crank pin on a disk $21^a$ at one end of the shaft 18 so that as said shaft rotates the cup-shaped valve is turned first to the position shown in Fig. 9 in order to receive the charge of seed, and then to the reverse position, as shown in Fig. 10, so as to discharge its contents into the receptacle 4$^a$, the valve in either position preventing unrestricted passage of the seed from the hopper 4 into said receptacle.

In the bottom of the hopper, above each delivery chute, is a pivoted plate 23 which is hung to the shaft 13$^a$, each of these plates having an arm 24, which arms are connected by a rod 24$^a$, one of the arms being also connected, by a rod 25, to a crank pin on the disk 21, so that the plates 23 rise and fall as the valves 20 are turned down or up, said plates thereby serving to agitate the seed in the hopper 4 and insure the proper flow of the same to the valves 20. In order to prevent the seed from entering the discharge chutes so rapidly or in such volume as to choke the same, I use in connection with each chute, an adjustable throat plate 35 which extends transversely across the chute, the seed being compelled to pass beneath this throat plate in order to gain access to the valves 20. When the hopper is full of seed, the throat plate is adjusted so as to restrict the area of the passage for the seed, as shown in Fig. 2, and by full lines in Fig. 9, but as the quantity of seed in the hopper is reduced, the plate may be raised, as shown by dotted lines in Fig. 9, so as to enlarge the passage.

In order to provide for the adjustment of the plates 35, each of the same has an arm connected to a rock shaft 35$^a$ and to the latter is secured a lever 36 contained within a central recess or pocket 36$^a$ formed in the front of the hopper, the lever being provided at the top with suitable retaining devices.

The recess or pocket 36$^a$ serves an important function in providing an open line of vision from front to rear of the machine so that the attendant, sitting upon the seat at the rear of the hopper, can see the seed selecting and dropping mechanism, the fertilizer distributer, and the furrowing device and can thus satisfy himself at any time whether or not the machine is working properly, and if not, can at once proceed to remedy the defect.

The impaling arms 19 are provided with impalers consisting of sharpened blades 26, secured one upon each side of the arm, although a single blade may in some cases be sufficient. Extending forwardly beyond these impalers are lifting and guard fingers 27, and within a slot in each impaling arm is a pusher lever 28 normally occupying such position as to be out of the way of seed impaled by the blades 26. The rear arm of each pusher lever, however, carries an antifriction roller, which, as the impaling arms rotate, is brought under the influence of a cam 29, Fig. 2 suitably mounted upon the casing of the receptacle 4$^a$, this cam having the effect of vibrating the pusher lever so as to cause it to discharge the seed from the impaler and permit it to fall into the furrow. There are, in the present instance, two sets of impaling arms 19, although more or less may be used, and the casing of the receptacle 4$^a$ is slotted for the passage of the two sets of impaling arms, the rear portion of the receptacle being formed by slotted bars 30 which insure the impalement of the seed by the impalers as the latter travel through that portion of the receptacle 4$^a$ containing the seed.

Each of the slotted bars 30 is composed of two bars 30$^a$ properly separated from each other so as to provide between them a channel for the passage of the fingers 27 of the impaling arms, and, in order to properly effect the pushing of the seed onto the impalers 26, each side of the slot in the bar 30 is provided with inclined ribs 31, which serve to catch and hold the seed as the latter are carried upward by the fingers 27 until said seed are firmly impaled upon the blades 26.

To prevent jamming or crushing of the seed in the upper portion of the slot of the bar 30, each half of said bar has near the upper end, a disk 32 mounted so as to be free to rotate and having, by preference, a toothed or roughened periphery, as shown in Figs. 6 and 7, so that when a loose or unimpaled seed is carried upward through the slot until it comes into contact with these disks, the latter will turn forward and thus throw the seed out of the slot and into the receptacle. One disk may answer the purpose in some cases, but the use of two disks, one on each side of the slot, is preferred.

The bars 30 are pivoted at their lower ends to a rod 33, in the rear of the receptacle, and an arm 34 on each bar is acted upon by a spring 37 connected at the upper end to a bearing on the fixed frame, and provided at the lower end with an adjusting nut 38, the tendency of this spring being to throw the upper ends of the bars 30 forward into the receptacle 4$^a$ to an extent limited by contact of a fixed stop 39 and an adjustable stop screw 40 at the upper end of the bar.

By proper adjustment of this screw, therefore, the position of the bar 30 in respect to the fingers and impalers of the rotating impaling arms can be readily governed, and the machine thus adapted for properly handling either large or small seed, while the bars 30 are at all times free to yield rearwardly whenever they are subjected to such pressure as is sufficient to overcome the tension upon the spring 37.

Having thus described my invention, I claim and desire to secure by Letters Patent—

1. The combination in a potato planter, of a seed receptacle, with rotating impaling arms, each having an impaling knife or blade, a pivoted pusher, and a finger forming part of the fixed arm, said finger being independent of the pusher and projecting forwardly beyond both the pusher and the impaling knife, substantially as specified.

2. The combination in a potato planter, of a seed receptacle, with rotating impaling arms each having an impaling knife, a slot behind the same, and a finger forming part of the arm and projecting beyond the knife, a pusher lever contained in the slot behind the knife, and a cam for operating the pusher lever as the arms are rotated, substantially as specified.

3. The combination of the rotating impaling arms, with the seed receptacle having at the rear a slotted bar, with rotating disk at the upper portion of the slot, substantially as specified.

4. The combination of the rotating impaling arms, with a seed receiver having at the rear a slotted bar held in position by a spring, and an adjustable stop for governing the relation of said slotted bar in respect to the impaling arms, substantially as specified.

5. The combination, in a potato planter, of the feed hopper, the seed receiver and the rotating impaling arms, with a cup valve for regulating the discharge of seed from the hopper into the receiver, and means for operating said valve, substantially as specified.

6. The combination, in a potato planter, of the hopper, the seed receiver and the rotating impaling arms, with a valve for regulating the discharge of the seed from the hopper into the receiver, an agitating plate in the hopper above said valve, and means for simultaneously operating said valve and plate, substantially as specified.

7. The combination of the hopper having a discharge chute at the bottom, an adjustable throat plate located in the hopper above said chute and a pivoted arm carrying said valve, whereby the latter is adjustable in the arc of a circle and in a direction longitudinal of the chute, substantially as specified.

8. The combination in a potato planter, of the seed impaling and dropping devices and the rear seat, with a seed hopper having in the upper portion of the front a recess or pocket, through which the attendant at the rear of the machine can observe the action of said seed impaling and dropping devices, substantially as specified.

In testimony whereof I have signed my name to this specification in the presence of two subscribing witnesses.

FILLMORE GAUNT.

Witnesses:
CHARLES H. RICHMAN,
WILLIAM B. FOSTER.